Figure 1:
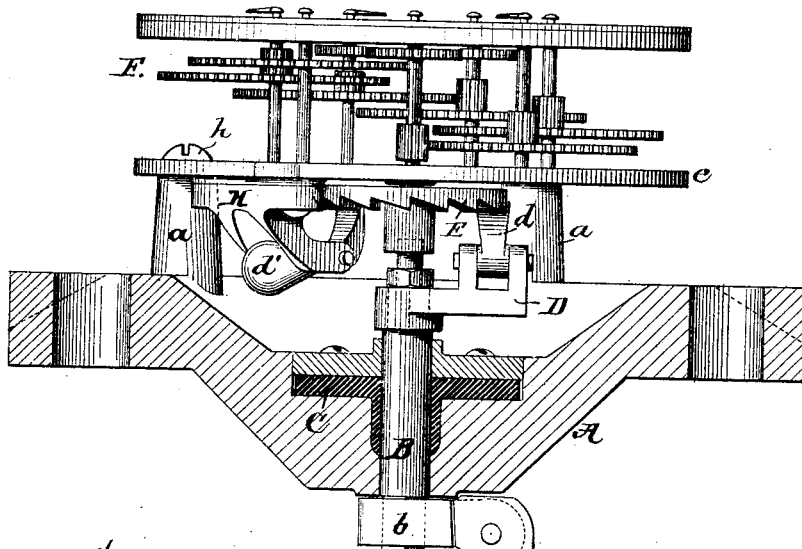

(No Model.)

C. C. WORTHINGTON.
REGISTERING MECHANISM FOR WATER METERS.

No. 269,366. Patented Dec. 19, 1882.

Attest:
Geo. H. Graham
Anthony N. Jasbera

Inventor,
C. C. Worthington,
by Munson & Philipp
Attys.

UNITED STATES PATENT OFFICE.

CHARLES C. WORTHINGTON, OF NEW YORK, N. Y.

REGISTERING MECHANISM FOR WATER-METERS.

SPECIFICATION forming part of Letters Patent No. 269,366, dated December 19, 1882.

Application filed November 21, 1881. (No model.)

*To all whom it may concern:*

Be it known that I, CHARLES C. WORTHINGTON, a citizen of the United States, residing in the city of New York, county of New York, and State of New York, have invented certain new and useful Improvements in Registering Mechanism for Water-Meters, fully described and represented in the following specification, and the accompanying drawings, forming a part of the same.

My invention relates to a registering mechanism applicable to water-meters generally, but particularly to the meter invented by Henry R. Worthington and described in United States Patent No. 13,320. It has been found in practice that the registering mechanism of the meter described in said patent has certain defects, and that said defects are principally due to the location and position of the ratchet-wheel and pawls through which the train of gearing by which the registering-pointers are moved is driven. This ratchet-wheel is located inside the meter, and consequently in the water, and is so positioned that it rotates in a horizontal plane, with its teeth, which are on one of its faces, projecting upward. This wheel and its driving and holding pawls being in the water are liable to become corroded with rust and covered with sediment to such an extent that they will not operate reliably. These parts, being inside the meter, are inaccessible for cleaning except by the removal of the top of the meter. To do this requires considerable labor and skill, because several bolts must be taken out, and great care must be taken that the packing of the joint is made perfectly water-tight when the top is replaced. When this is done it is also necessary to cut the water off from the meter by shutting the cock in the service-pipe, and this also is inconvenient and vexatious. Another disadvantage arising from locating the ratchet mechanism inside the meter is, that the shaft which communicates motion from the ratchet to the train of gearing carrying the registering-pointers, which shaft must of necessity be rotated, passes through the wall of the meter. Of course where this shaft passes through the wall there must be a water-tight joint, and to make this joint packing must be used. This packing usually consists of rubber, and is in time, particularly if the meter remains idle, liable to adhere to the shaft to such an extent that when the shaft is rotated either the packing is torn and destroyed, or else the shaft held so firmly that the ratchet mechanism is broken.

It is the object of my invention, among other things, to overcome these several difficulties. This I do by locating the ratchet mechanism outside of the walls of the meter and placing the ratchet-teeth upon the under face of the wheel. These parts, being out of the water, are free from sediment and less liable to rust or corrode, and the wheel being placed with its teeth facing downward nothing can lodge upon them which will prevent the pawls from acting. By locating the ratchet mechanism outside of the walls of the meter all necessity for gaining access to the interior in case of defective working is avoided, and I also avoid the necessity of having a rotating shaft pass through said walls. Instead of having the shaft which carries the ratchet-wheel, and which, as before said, necessarily rotates, pass through into the meter, the shaft which carries the driving-pawl and which only rocks or vibrates alone passes to the interior. The vibrations of this shaft are always short, (about one-eighth of a revolution,) so that if the packing should adhere to the shaft, or even if it should be solidly attached to it, the elasticity of the rubber is such that the shaft could continue its vibrations and the register would operate practically without injury to either the packing or ratchet mechanism. I also arrange the driving and holding pawls of the registering mechanism in a novel manner, all of which will be hereinafter fully described and pointed out in detail.

Figure 3:
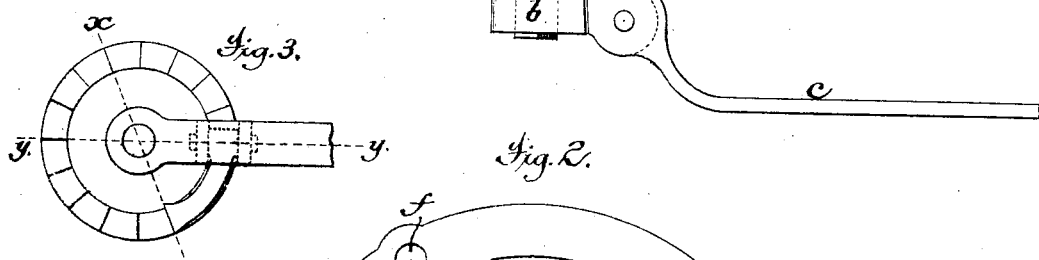
Figure 2:
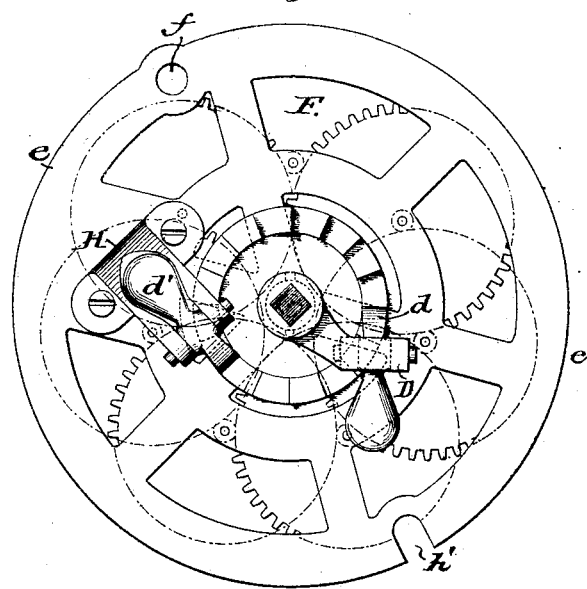

In the accompanying drawings, Figure 1 is a side elevation, partly in section, of a registering mechanism embodying my invention and applied to a Worthington meter. Fig. 2 is a plan view of the register mechanism, looking from the under side. Fig. 3 is a detail, to be hereinafter referred to.

A represents the part of the shell or casing of the meter to which the registering mechanism is attached by means of the short legs or standards *a*. Through a suitable aperture in this casing passes the shaft B. The joint between the shaft and casing is made water-tight by means of the packing C, which is of rubber or any other suitable material.

To the lower end of the shaft B is rigidly attached the rock-arm *b*, to the end of which is pivoted the extension c, which is connected to one of the pistons of the meter. To the upper end of the shaft B is rigidly secured the arm D, to the outer end of which is pivoted the weighted pawl d, which engages with and operates the ratchet-wheel E. This ratchet is held from retrograde movement by means of the weighted pawl d', which is secured to the under side of the register-casing.

F is the register mechanism proper, and consists of the usual train of gearing, secured in a suitable frame and provided with a series of dials and pointers, all of which is well known and need not be here described. To the lower end of the main shaft of this register mechanism, and below the bottom plate of its casing, is secured the ratchet-wheel E, having its teeth upon its lower face. The purpose of thus positioning this ratchet has already been stated, and needs no further explanation. As shown in Fig. 1 of the drawings, the shaft carrying the ratchet E rests loosely upon the upper end of the vibrating shaft B; but it is not necessary that it should rest upon this shaft, as it may be held in its proper position by other means—as, for instance, by a collar passing around it just above plate e.

The operation of the parts thus far described is as follows: The piston, being reciprocated by the flow of the water through the meter, gives a vibrating motion to the arm c, shaft B, and pawl d, by which the ratchet E and main shaft of the register-gearing is rotated with a step-by-step motion, thus causing the pointers upon the dials to indicate in the well-known way the amount of water consumed. As before stated, if the packing C sticks to the shaft B, as it sometimes does, particularly if the meter should be allowed to remain idle for any length of time, it will, instead of being torn loose and destroyed by the continued revolution of the shaft, as in the meters heretofore used, simply stretch when the shaft is rocked in one direction and retract when the shaft returns, and a tight joint and sound packing will be preserved.

In registering mechanisms of meters of this class as heretofore constructed the driving and holding pawls have been pivoted in the manner shown in Fig. 3—that is to say, with the axis of the pivot at an angle to the face of the ratchet-tooth with which the pawl was in engagement at any time. This is illustrated in said figure by the dotted lines x x and y y. When pivoted in this manner the friction of the pawls upon the ratchet is such that they are constantly pressed to one side and will not bear squarely upon their journals—that is to say, the pressure constantly tends to draw them to such a position that the axes of their pivots will be parallel to the face of the teeth being acted upon. This pressure causes the pawls to bind more or less against the lugs between which they are pivoted, and this binding is sometimes so great as to cause the pawls to lock and prevent the operation of the register. To remedy this defect, I have pivoted the pawls in the position shown in Fig. 2. By making the arm D, carrying the pawl d, angular, as shown, I am enabled to pivot this pawl in such a position that the axis of its pivot will be parallel to the face of the tooth of the ratchet upon which it acts, and with this construction I find that the said pawl never fails to operate perfectly. In like manner, by setting the bracket H, which carries the holding-pawl d' in the position shown, I secure the same perfect operation for this pawl also.

Another feature of construction which I have found to be of no small advantage is that which I have adopted for making the register mechanism easily removable from the standards to which it is secured. The top of one of the standards a is provided with a lug or a bolt, h, with a flange or projection around its head, and the lower plate of the register casing or frame is provided with a corresponding slot, h', which will embrace the lug or bolt while its flange projects over the edges of said slot. One of the standards upon the opposite side of the casing is tapped for a screw, and over this tap the lower plate of the casing is provided with the hole f, through which a screw passes into the standard. The register-carrying frame or casing is thus held securely in place, and can at the same time be quickly and easily removed by simply withdrawing one screw.

Heretofore, so far as I am aware, no register mechanism has been provided with this slot h', and consequently two screws have had to be removed. These screws, being located beneath the overhanging upper plate of the casing, are not easily accessible, and they being also in close proximity to the gearing of the register, any slip of the screw-driver is liable to injure said gearing, as it is comparatively delicate. This being the case it is desirable to remove the register with as little use of the screw-driver as possible.

Having thus described my invention, what I claim as new, and desire to secure by Letters Patent, is—

In a water-meter, the combination, with the rocking or vibrating shaft B, extending through the meter-casing and provided with the arm D, carrying the weighted driving-pawl d, of the register mechanism and its horizontally-revolving ratchet-wheel E, having its teeth upon its under face, and the weighted holding-pawl d', said pawls being arranged to engage with the teeth upon the under face of said wheel and being so positioned that the axes of their pivots are parallel with the teeth of the ratchet with which they are in engagement at any time, substantially as described.

In testimony whereof I have hereunto set my hand in the presence of two subscribing witnesses.

CHAS. C. WORTHINGTON.

Witnesses:
J. A. HOVEY,
GEO. H. GRAHAM.